United States Patent [19]
Goldman et al.

[11] Patent Number: 4,960,331
[45] Date of Patent: Oct. 2, 1990

[54] FARADAY ROTATOR ASSEMBLY

[75] Inventors: Robert P. Goldman, Woodland Hills; John G. Larson, Tarzana, both of Calif.

[73] Assignee: Litton Systems, Inc., Beverly Hills, Calif.

[21] Appl. No.: 279,354

[22] Filed: Dec. 2, 1988

[51] Int. Cl.$^5$ .............................................. G01C 19/64
[52] U.S. Cl. ................................... 356/350; 350/375; 372/19; 372/103
[58] Field of Search ......................... 356/350; 350/375; 372/19, 103, 105, 94

[56] References Cited

U.S. PATENT DOCUMENTS
4,284,329 9/1981 Smith .
4,548,501 11/1985 Smith .

FOREIGN PATENT DOCUMENTS
WO88/02103 3/1988 PCT Int'l Appl. ................. 356/350

OTHER PUBLICATIONS
Roland, "Periodic Faraday Bias and Lock-in Phenomena in Laser Gyro," *Applied Optics*, vol. 12, No. 7, 1460–1467.

Primary Examiner—Vincent P. McGraw
Attorney, Agent, or Firm—L. David Rish

[57] ABSTRACT

Disclosed herein in a side mounted aperture and a Faraday rotator assembly useful in conjunction with an out-of-plane multi-oscillator ring laser gyroscope. The aperture and Faraday rotator assemblies contain components which are optically contacted to one another as well as the ring laser gyroscope frame. The assemblies disclosed herein provide a simplified construction designed to fixture the Faraday rotator element in order to minimize handling and facilitate alignment to the ring laser gyroscope cavity, free from contamination and in proper alignment for optimum use of the Faraday rotator component and aperture needed for proper operation of an out-of-plane multi-oscillator ring laser gyroscope.

12 Claims, 3 Drawing Sheets

FARADAY ROTATOR ASSEMBLY

BACKGROUND OF THE INVENTION

1. Field of the Invention

This invention relates to ring laser gyroscopes, and more particularly ring laser gyroscopes having self-contained, externally assembled, transverse insertable aperture and Faraday rotator assemblies for use in conjunction with multi-oscillator ring laser gyroscopes.

2. Description of the Related Art

Since its introduction in the early 1960's as a laboratory experiment, the ring laser gyroscope has been developed and used as a commercial product as a logical replacement for the mechanical gyroscope, for use in all manner of inertial guidance systems. Heretofore, the basic two mode ring laser gyroscope has been developed which has two independent electro-magnetic wave modes oscillating in an optical ring cavity. When the ring is stationary, no rotation is ideally indicated. As the ring cavity is rotated about its central axis, the counter rotating waves interact with one another so that a beat frequency is developed. A linear relationship between the beat frequency and the rotation rate of the optical path with respect to the inertial frame of reference may be established. Ideally, the rotation rate is proportional to the beat mode. In this manner, a gyroscope is theoretically produced having no moving parts.

In practice, however, the two mode laser gyroscope often must be mechanically dithered to keep counter rotating travelling waves from locking at low rotation rates. For more information on planar gyroscope two -mode lock-in, please see *Laser Applications*, by Monte Ross, Ed., pp. 133–200 (1971). In an effort to solve this lock-in problem, non-planar ring cavities have been designed containing more than one pair of counter-rotating modes.

These multi-oscillator ring laser gyroscopes have been developed to achieve the goal of an accurate all optical gyroscope having no moving parts. In the multi-oscillator ring laser gyroscope, the Faraday rotator is a miniature optical element which, when in the presence of a magnetic field, induces a non-reciprocal frequency splitting of right and left-handed circularly polarized beams. This "Faraday splitting" prevents the ring laser gyroscope lock-in phenomenon which is detrimental to the ring laser gyroscope mechanism. Since the Faraday rotator is an intracavity element, it is essential that loss and scatter (due to the rotator) is minimal in order not to limit gyroscope performance. Recently Faraday rotator fabrication technology has developed to a level where production of very low loss, low scatter Faraday rotators is possible. However, in the past, considerable surface degradation and/or contamination incurred at rotator-to-cavity alignment has prevented optimal multi-oscillator ring laser gyroscope performance. For a full discussion of the multi-oscillator ring laser gyroscope, please see Laser Handbook (Vol. IV) Ed. by M. L. Stitch (1985) pp. 229–332.

A non-planar configuration comprising four mirrors and a Faraday rotator is described in Smith, U.S. Pat. No. 4,548,501 issued Oct. 22, 1985.

Critical to the operation of the Faraday rotator is the need to provide a magnetic field propagating through the Faraday element. Heretofore, this critical function has been accomplished by the use of a musket-loaded assembly shown at 42 of FIG. 1. A detailed cross-sectional view of the prior art musket-loaded assembly is shown in FIG. 2. Past rotator alignment procedures have involved the hand-pressing of individual glass and metal components onto a small shelf in the cavity bore. The pressing is performed to seal the various components with indium. Due to the length of time required to align the components to the cavity bore, the number of times the alignment technician must insert the pressing tool, and the inconsistencies involved in hand operation of the pressing tool, this procedure rarely maintains the original condition of the Faraday rotator element. Under these conditions, cavity and rotator contamination is imminent. Furthermore, if the rotator is improperly aligned after being indium-sealed, it must be destructively removed. Generally, if this occurs, the integrity of the assembly components (carrier piece, magnets, etc) is compromised and the entire assembly must be removed and the frame re-cleaned. At this point, there is a high risk that the cavity becomes contaminated.

With reference to FIGS. 1 and 2, heretofore, a musket-loaded assembly 42 was placed into the optical path 48 through the counter-sink mirror mount bore 38. Prior to securing mirror 22 to the counter-sink bore 38 and the gyroscope block frame 12, musket-loaded rotator assembly 42 was placed into the optical path 48 through a telescopic insertion as shown in FIG. 1. The entire assembly 42 is shown in detail in FIG. 2. Prior Art FIG. 2 shows that the rotator assembly 42 is positioned along the optical pathway within the frame 12 and is comprised of a carrier piece 60 which supports a rotator glass piece 50 and defines an aperture 64 for transverse mode suppression of incoming light. The carrier piece 60 and glass piece 50 are surrounded by a plurality of permanent magnets 56, 62, and 58. The annular magnets are stacked on one another and enclosed by ferrous metal rings 52 and 54. Preferably, these ferrous metal rings are made from a non-magnetic ferrous material. The inner cylindrical magnet 56 and the outer cylindrical magnet 58 are each secured to these rings, at 52 and 54, respectively by use of an indium seal. The central cylindrical magnet 62 is substantially thicker than either the inner or outer cylindrical magnets. Each of the magnets are positioned providing an overall super dipole construction. In this manner a relatively uniform magnetic field passes through the Faraday glass piece 50 to perform the Faraday splitting effect.

The musket-loaded assembly illustrated in FIG. 1 and shown in detail in Prior Art FIG. 2, has exhibited considerable surface degradation and contamination which has occurred during the rotator to cavity bore alignment procedure preventing optimal multi-oscillator ring laser gyroscope performance. As may easily be seen with reference to FIG. 1, musket-loading of the rotator assembly 42 into the optical pathway 48C requires that the bore defining the optical pathway 48C be carefully machined to accomodate the insertion of the musket-loaded rotator assembly 42. Furthermore alignment of this assembly must be accomplished at a distance. Musket-loaded assembly is not easily maneuvered within the bore defining the optical pathway portion 48C once the assembly is loaded within the bore. Heretofore, the use of musket loaded rotator assemblies results in a less than optimum Faraday rotator performance during operation.

Attempts to overcome the contamination and alignment problems, as well as the inherent stress placed on the glass piece of the Faraday rotator have been tried but with minimal success. For example, a Faraday bias element together with solenoid magnet is shown as used on page 1463 of J. J. Roland, et. al., *Periodic Faraday Bias and Lock-In Phenomena in Laser Gyro*, APPLIED OPTICS, Vol. 12, No. 7, 1460–1467 (July 1973). This assembly was used in conjunction with an open optical pathway that is completed with the use of Brewster windows for out-of-plane multi-oscillator ring laser gyroscopes. Likewise, a side-loaded bias package containing a Faraday plate, bias coil, and quarter wave plate for use in a planar ring laser gyroscope was disclosed in a now unclassified U.S. Air Force avionics laboratory technical report AFAL-TR-71-339 (November, 1971). While a side-loaded design which would be simpler than the musket-loaded assembly shown in FIGS. 1 and 2, the integrity of the optical pathway is not clearly maintained.

As an alternative solution to the precision machining needed to produce a passageway constriction or aperture such as 46 along optical pathway 48C of FIG. 1, an unpublished photograph and blueprints for a side-loaded aperture mount was disclosed within Litton during April, 1976. This manner of teaching a side-mounted aperture mount to replace a finely machined restriction within the optical path does not teach the manner in which the side mountable aperture shown in the Litton proprietary materials (which will be presented to the examiner in a subsequently filed Information Disclosure Document) does not disclose any manner for securing the side-loadable aperture mount into the gyroscope block frame.

Additionally, side loaded Faraday rotator assemblies have been suggested for loading into a monolithic multi-oscillator ring laser gyroscope. U.S. patent application, Ser. No. 777,775, filed Mar. 15, 1977 (Thomas J. Hutchings, Inventor) disclosed a scheme for such a side loaded assembly, but is not specific in its teachings as to how such an assembly is constructed nor how it should be sealed to the gyroscope block frame. In this patent, the application suggests the use of element 52 for accomplishing multi-mode operation.

A more recent attempt at providing an alternative structure to the musket-loaded assembly 42 of FIG. 1 was discussed and diclosed in U.S. Pat. NO. 4,284,329 issued to Smith Aug. 18, 1981. FIGS. 6, 6A, and 6B of the '329 Smith patent disclosed a Faraday rotator 156 which is comprised of the Faraday rotator mount 154 having a central portion with one end flanged to restrain lateral movement of the device within the aperture 120 provided in the laser gyro block 102. The other end of the Faraday rotator mount 154 is cut away to leave a platform for mounting active components such as the permanent magnet 166, the Faraday rotator slab 165, and the pole piece 170 which forms a carrier function similar to the carrier piece shown in this application's FIG. 2. A coil spring 168 is forced against the Faraday slab 165 within the inner diameter of annular permanent magnet rings 166 (or a plurality of rings 172 and 176 positioned in opposing dipole directions along the axis of the optical pathway), surrounding the Faraday rotator 165 and the coil spring 168. The purpose of the coil spring is to hold the rotator slab 165 against the Faraday rotator mount 154. Smith teaches that the Faraday rotator mount 154 is preferably formed of the same material as the laser gyro block 102. Smith also teaches that the Faraday rotator 156 performs a second function. Because of the close fit provided within the aperture 120 in the gyro block 102, the Faraday rotator 156 blocks the longitudinal flow of gas through the passage 112. This, as Smith explains, prevents a net circulation of gas through the closed path which he believes acts to substantially reduce the possibility of circulation of scatter particles carried by the gas. Although Smith discloses a method of assembly of the Faraday rotator into the gyro block 102 body, Smith does not teach how the Faraday rotator mount 152 will be secured to the gyro block 102, nor does Smith address the problems of stress and deformation to the Faraday rotator slab 165 provided by the coil spring 168 to the surface of the Faraday rotator slab 165. Also it is unlikely that the Faraday rotator mount as taught by Smith will substantially reduce contamination being introduced into the optical pathway within the gyro block 102.

SUMMARY OF THE INVENTION

What is needed is a Faraday rotator assembly which is easier to build and insert into the gyro block frame of a ring laser gyroscope than the musket-loaded assembly 42 of the prior art without the undue stress and contamination occurring in prior art side-loaded assemblies.

A side, top or bottom bore is formed, usually having a round cross-section, from the outside into a ring laser gyro block frame, intersecting the ring laser cavity. The angle of intersection is usually substantially ninety degrees, but a wide variation in that angle is allowed. It is, however, necessary that the angle of intersection be known and that the plug and its attached optical elements be precisely positioned on the inner end of the plug to intercept laser beams in a predetermined manner.

This invention discloses an insertable optical assembly, such as a side loaded aperture or Faraday rotator assembly for use in conjunction with a multi-mode ring laser gyroscope, which provides optical contact between the frame and assembly, so that the optically active assembly may be kept in registration with the optical pathway of a multi-oscillator ring laser gyroscope. The assembly is comprised of an elongated optical plug having at least one end exhibiting low surface roughness and optical flatness. Affixed to the optically flat surface is a smooth surface optical flat of diameter greater than the elongated optical plug such that the flat forms an inner, optically flat flanged surface that is suitable for optical contact to the polished outer surface of a ring laser gyroscope frame. (Please see FIG. 6 at 47). The elongated optical plug may be of a cylindrical shape for ease of positioning the plug within the transverse hole of the frame into which the assembly is inserted. At the other end of the plug, an aperture may be formed providing transverse mode suppression and providing an optically contacted insertable aperture assembly. Additionally, an optically polished Faraday glass piece which will provide a non-reciprocal rotation, may be optically contacted to and mounted on a flat surface of the optical plug, suitable for positioning an alignment of the plug. The Faraday glass piece may thereby be mounted into the gyro frame without undue stress and strain.

The assembly, according to this invention, is a mechanically precise plug assembly having an unusually tight fit, or "optical contact," to the side, top or bottom bore of the ring laser gyro block frame. Additionally, optically contacting the plug assembly to the ring laser block frame excludes contaminating materials and supports and precisely positions optical elements. In a preferred embodiment, a flange is placed on the outer end of the assembly, and the surface of that flange should face the laser block with an optically flat finish. Adjacent the receiving side, bottom or top bore, the outer surface of the block also makes an optically flat surface. The shape of the bore closely matches the shape of the body of the assembly, or plug, (but a substantial tolerance exists between the plug and bore to allow rotational and translational motion of the plug during alignment prior to final positioning of plug within the bore); and, the plane of the optically flat surface on the attached flange is positioned at an angle relative to the axis of the plug so that, when the plug is inserted into the bore, the optically flat surfaces on the flange and the outside of the laser block are parallel and in conforming contact. Without any cement or other adhesive between the optically flat contacting surfaces, the adhesion between the two surfaces seals the plug assembly into the bore. However, adhesive may, optionally, be added between the flat surfaces as desired.

The assembly is precision crafted so that when the assembly is properly inserted into the side bore of the laser block, the Faraday optics, mode rejecting aperture, or other optics are precisely aligned with the laser beams within the ring laser.

In a preferred embodiment, to avoid mis-alignment of the optical elements supported by the plug, relative to the laser beams, the inserted assembly and the gyro laser block frame are fabricated of the same material, whereby they expand together, preventing induced stress between the plug and the ring laser body. A preferable material is a glass-ceramic, and the preferred glass-ceramic has a minimum dimension change with expected temperature changes. One such glass ceramic used in this assembly has the trade name or mark of ZERODUR.

In one embodiment, the Faraday glass piece is mounted on a support pedestal extending and orthogonal from the surface of the plug. Surrounding the perimeter of the Faraday glass piece and mounted on the optical plug are a plurality of annular magnetic dipoles, the dipoles affixed to one another and to the plug by use of a metallic sealing material. The dipoles do not directly contact nor stress the Faraday glass piece. Metal sealing material may be indium.

An alternative embodiment for the Faraday rotator assembly is comprised of a plug and flat optically contacted at one end of the plug. The elongated plug is then inserted into the transverse hole receiving the assembly. At the other end of the elongated plug is a Faraday glass piece mounted on said end and optically contacted to the plug. This Faraday rotator may be substantially cubic in shape for ease of machining.

These and other advantages of the invention over the current state of the art of ring laser gyroscopes will be seen by a review of the description of the drawings and the preferred embodiment of this invention which follows.

DETAILED DESCRIPTION OF THE PREFERRED EMBODIMENT

The Self-Contained Faraday rotator assembly consists of a glass-ceramic "plug" which is designed to fixture the Faraday rotator element in order to minimize handling and facilitate alignment to the ring laser gyroscope cavity. A main advantage of this design is that the Faraday element is aligned and sealed to the glass-ceramic plug external to the cavity. This greatly reduces the risk of cavity contamination and possibility of rotator surface degradation due to contamination and/or handling during the rotator to cavity alignment stage. Once constructed, the assembly can then be inserted into the cavity through a single hole on either the side, bottom, or top of the frame (depending on the particular frame design.) The assembly is then sealed to the frame by optically-contacting a flat substrate (attached to one end of the cylindrical plug) to the exterior of the frame (see FIG. 6). If replacement of the rotator assembly is necessary during or after cavity alignment, the flat is removed and the entire assembly withdrawn so that a whole new assembly can be reinserted.

With the self contained Faraday rotator assembly, the risk of cavity contamination and the time required to perform the critical alignment is greatly reduced since all components of the assembly are aligned and sealed external to the cavity. If the rotator degrades for any reason at the time of critical alignment, the entire assembly can be discarded and a new attempt be made without jeopardizing the cleanliness of the laser cavity. To expedite this procedure, many assemblies can be made and stored so that the technician has access to more that one assembly during build. In order to prevent surface degradation during storage, the rotator assemblies are contained in evacuated desiccators.

A side, top or bottom bore is formed, usually having a round cross-section, from the outside into a ring laser gyro block frame, intersecting the ring laser cavity. The angle of intersection is usually substantially ninety degrees, but a wide variation in that angle is allowed. It is, however, necessary that the angle of intersection be known and that the plug and its attached optical elements be precisely positioned on the inner end of the plug to intercept laser beams in a predetermined manner.

It is known that standard fits between contacting elements include, sliding fits, interference fits, and fits with tolerances between the elements. The fit chosen for this invention is a zero-tolerance fit wherein the parts fit together within fractions of the wavelength of visible light.

Figure 1:
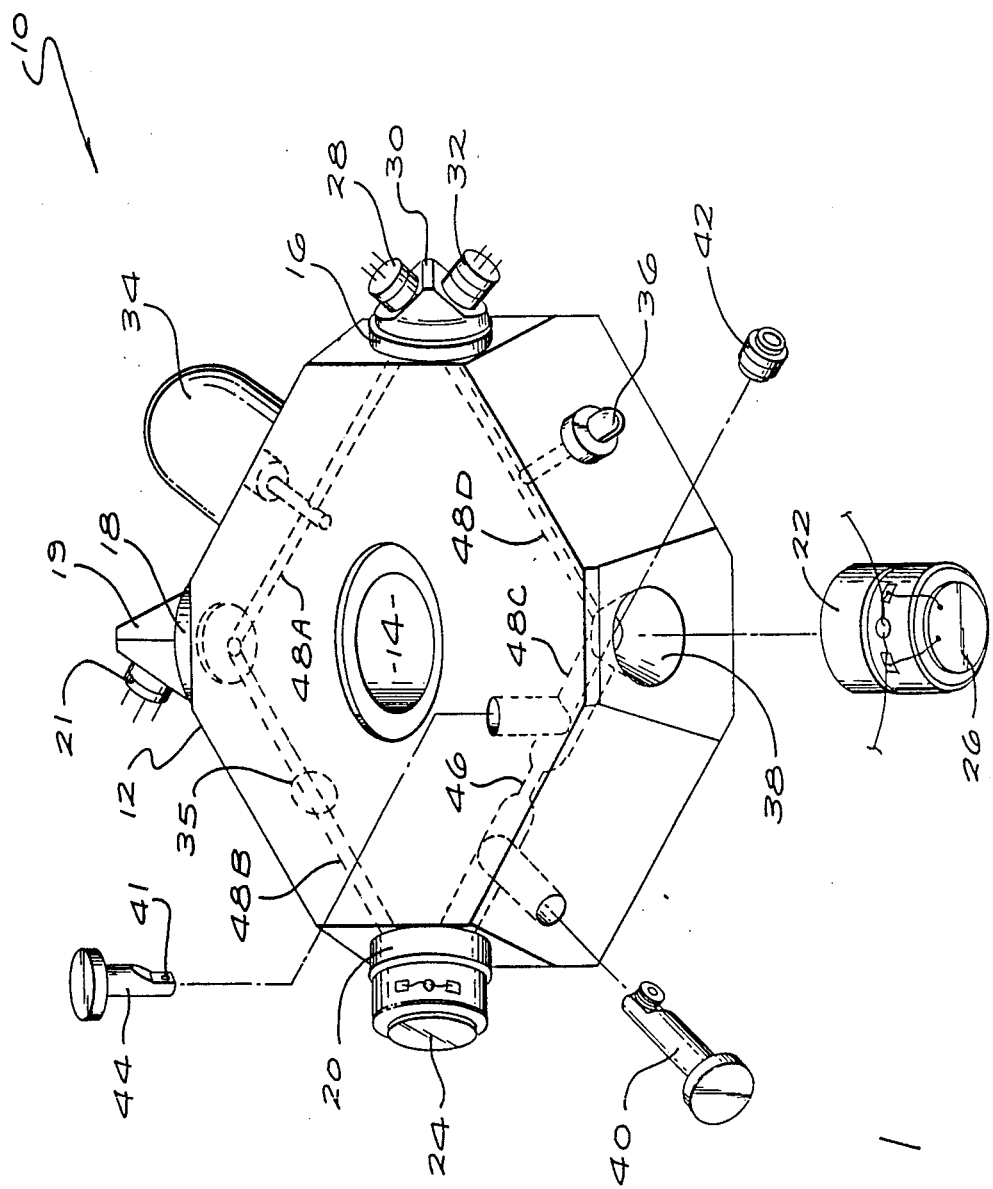
FIG. 1 shows a perspective view of a prototype multi-oscillator out of plane ring laser gyroscope, illustrating the insertion into the gyroscope block frame of prior art rotator assemblies as well as the positioning of rotator and aperture assemblies that are the subject of this invention.
Figure 2:
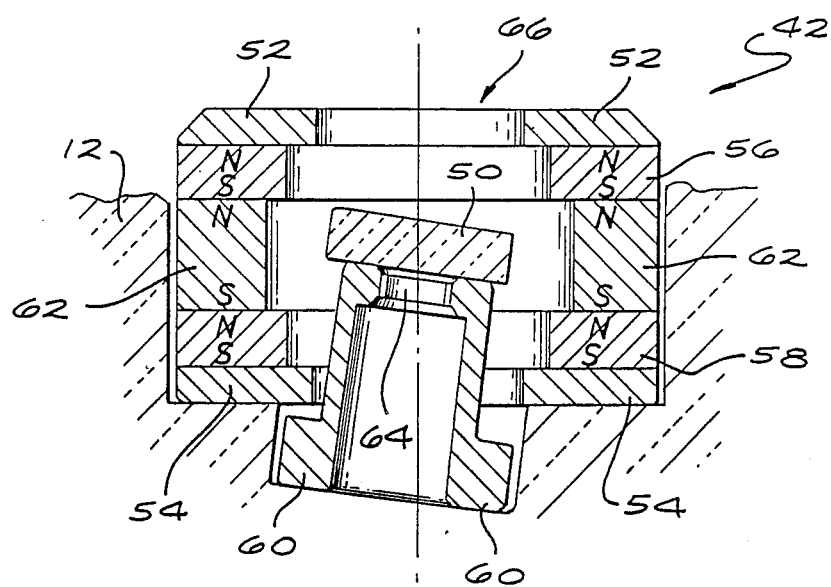
FIG. 2 is directed to a prior art cross-sectional view of the musket-loaded Faraday rotator assembly 42 of FIG. 1.

With reference to FIG. 1, a demonstration model of an out of plane multi-oscillator ring laser gyroscope is shown generally at 10. The gyroscope is made from a monolithic block frame 12, through which a bore is carved substantially along its perimeter to define the optical pathway 48A, 48B, 48C, and 48D. Positioned along the optical pathway are a plurality of mirrors 16, 18, 20, and 22. The entire block is mounted on a post 14. The laser action of the gyroscope is produced by active medium formed between the cathode 34 and each of the anodes 35 and 36 positioned along the optical pathway. The cathode 34 and the anodes 35 and 36 define an active gain medium therebetween in a conventional gyroscope. A portion of the pathway may be restricted as shown by the aperture 46. In order to operate, and compensate for temperature variations, active backscatter detectors 28 and 32 are positioned at a backscatter prism 30 and are used to provide feedback information to the cavity length controls 24 and 26 in order to allow the gyroscope to adjust for temperature variations in the environment. Additionally, output optics 19 are positioned at semi-transparent mirror 18 for detection by the detector 21 of output heterodyne signals used to measure rotation as sensed by the ring laser gyroscope 10.

For ease of illustration and understanding only, and not as an example of a fully functional multi-oscillator ring laser gyroscope, a musket-loaded Faraday rotator assembly 42 is shown being inserted into optical pathway 48C. As an alternative to the musket-loaded assembly, a rotator assembly 40 may be transversely loaded into the optical pathway 48C and optically sealed to the body of the gyro frame 12 as will be more fully explained hereinafter. Since the function of the Faraday rotator depends on the presence of a magnetic field, it is necessary to introduce permanent magnets. With past designs, radial magnets have been individually indium-sealed during installation of rotator assembly components. The new self contained design disclosed herein provides the capability of attaching radial magnets directly to the glass-ceramic plug, external to the cavity. However, the most recent magnet assembly design incorporates permanent rod magnets (transversely magnetized) that are installed into the bulk of the frame surrounding the bore (external to the active cavity) and prior to the insertion of the plug into the cavity bore. To replace the constricted aperture that is machined into the optical pathway 48C, an insertable aperture assembly 44 may be top or side loaded into the optical pathway 48C as illustrated. The aperture assembly is optically contacted to the gyro frame 12 and defines an aperture 41 which may be used for transverse mode suppression required in a ring laser gyroscope. Both the rotator assembly 40 and the aperture assembly 44 are optically contacted to the gyro frame 12 to prevent escape of gas medium from the optical pathway 48.

Figure 3:
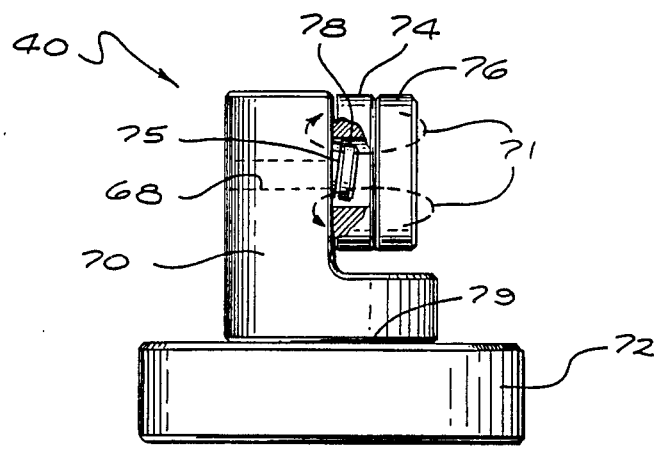
FIG. 3 shows a side elevational view, partially in cross section, of a first embodiment of the Faraday rotator assembly of this invention.

With reference to FIG. 3, a preferred embodiment of the side loaded, optically contacted rotator assembly 40 of applicant's invention is shown. An elongated plug 70 is optically contacted at the surface 79 to the optically polished flat 72. A portion of the cylindrical plug 70 is carved out and a pedestal 75 extends forward from the surface of the plug 70 to support an optically contacted and mounted Faraday glass piece 78. Surrounding, but not in contact with, the Faraday glass piece 78 are two annular magnetic dipoles configured in an opposing pole configuration so that the dipole 74 and 76 form a quadrapole allowing a uniform magnetic flux (illustrated at 71) to extend through the Faraday glass piece 78. An opening 68 is defined behind the pedestal 75 which may serve as an aperture making the assembly 70 a combined rotator and aperture assembly. The applicant has found that it is preferable that any side loaded Faraday rotator assembly be constructed in such a manner as to not interrupt gas flow throughout the cavity forming the optical pathway, in sharp contrast to the teachings of the Smith '329 patent. Also, unlike Smith, which teaches that the Faraday rotator mount 154 should be a one piece flanged part, applicant has a rotator glass piece support structure which is made from the optical contact of the elongated support plug 70 onto the surface of the optically smooth flat 72. This insures that the remaining flanged extending portion of the upper surface of the flat 72 will be suitable for optical contact to the gyroscope block frame 12. By optically contacting the entire assembly within the gyroscope body, and using the same material glass to form this assembly as the glass used to form the gyroscope block frame 12, proper alignment and registration of the rotator will be assured even during temperature fluctuations and a variety of ambient environments that the gyroscope is found to be placed in. This also is in sharp contrast to the teachings of Smith. Smith's use of a single piece Faraday mount 154 teaches against any ability to optically contact the outer flange of this rotator mount 154 onto the gyro block 102 of the Smith patent. (Unlike the applicant's design, the Smith teaching does not assure a reliable and consistent alignment of the rotator within the optical pathway which is critical to its performance.)

Two components which are optically contacted together behave, for practical purposes, as a single piece whose mating interface can not easily be separated. This condition can only be achieved if the elements contacted together are optically flat and extremely clean.

A surface which is optically flat is flat to within fractions of a wavelength of visible light. Typically this ranges from $\lambda/2$ to $\lambda/20$ where $\lambda$, the wavelength, is on the order of 500 nanometers. Effectively, the molecular structure of each piece is brought in such close proximity to each other that there exists a Coulombic attraction (electrons) between them, effectively producing a permanent contact. It has only been in approximately the last decade where glass and glass-ceramic polishing technology has developed to where surfaces of this flatness can be achieved. This, along with advanced methods of cleaning, have enabled superlative optical contacts.

The advantages of optical contacting are primarily mechanical in nature. Glass (or glass-ceramic) structures, too complicated or expensive to machine, can be effectively produced by fabricating component parts with optically flat surfaces that can be contacted together to produce more complicated structures. This concept has been applied to the Faraday rotator assembly 40. Furthermore, the Faraday rotator assembly 40 has been designed in a fashion so that the entire structure can be optically contacted to the outside of the gyro frame. This enables exact registration of the Faraday element since the material from which the Faraday rotator assembly is made is the same as the gyro frame (in this case, Zerodur). The whole system (rotator assembly plus frame) expands, contracts, and distorts over thermal and pressure environments as if it was one integral system.

Figures 4, 5, 6, 7:
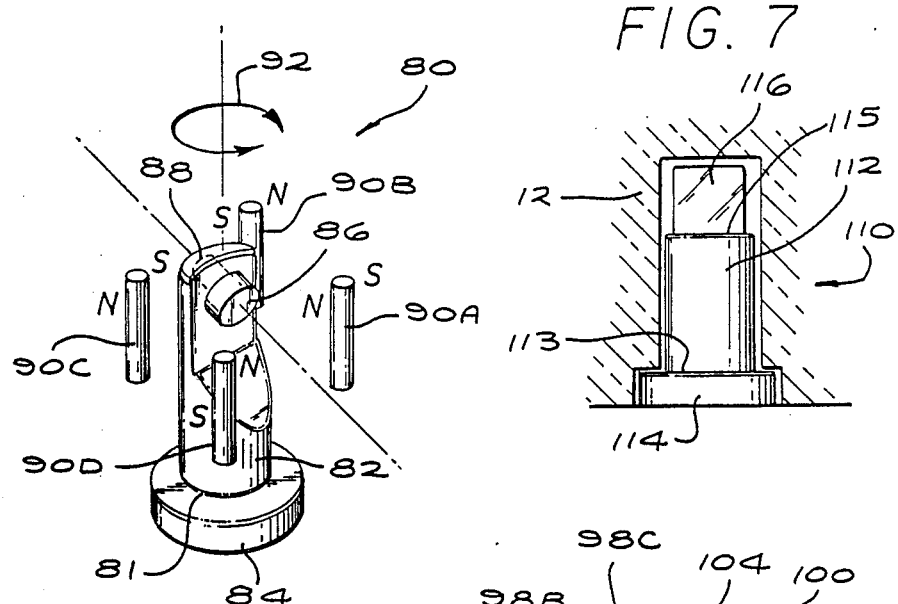
FIG. 4 shows another embodiment of the Faraday rotator assembly of this invention for use in conjunction with permanent magnets external to the optical pathway.
FIG. 5 shows yet another embodiment of the Faraday rotator assembly in perspective of this invention which uses a plurality of annular permanent magnets.
FIG. 6 is an illustrative cross-sectional view showing two different sealing techniques for securing an insertable aperture assembly into the gyroscope lock frame 12 for within the optical cavity 48.
FIG. 7 is directed to still another embodiment of the rotator assembly of this invention wherein the elongated plug 112 makes optical contact along at least two of its surfaces.

Another alternate embodiment of the rotator assembly of this invention is shown in FIG. 4. As taught in an application previously filed by the same assignee of this invention, Ser. No. 07/228,308, magnets 90A, 90B, 90C and 90D external to the optical pathway may be used to form an octupole for providing the magnetic field used in conjunction with Faraday rotator glass piece 86. Like the previous design shown in FIG. 3, this embodiment of the rotator assembly 80 is comprised of an optically smooth flat 84 which is optically contacted along surface 81 to one end of a support plug 82. The Faraday glass piece 86 is mounted directly on a flat surface of the plug 82. A passageway 88 is formed through the plug to allow the passage along the optical pathway. The entire assembly may be rotated about its axis 92 during initial alignment in order to align the rotator glass piece 86 properly within the magnetic field defined by the octopole magnets 90A-D.

FIG. 5 shows yet another embodiment of the Faraday rotator of this invention supporting at least 3 annular magnets, namely 98A, 98B, and 98C. An optical flat 94 is optically contacted at 97 to one end of the optically polished support plug 96. A portion of the support plug 96 is carved away and provides a support pedestal 102 which is used to mount the Faraday glass piece (not shown). A passageway 104 is defined through the support plug 96 to ensure passage of the light beams through the assembly 100.

Yet another embodiment of the side mounted Faraday rotator assembly of this invention is shown at FIG. 7 generally at 110. The Faraday rotator assembly 110 is mounted into the gyro block frame 12 sideways, to intersect with the optical pathway of the gyro frame 12. An elongated support plug 112 is optically contacted at one end at surface 113 to an optically smooth flat 114. At its other end, the support plug 112 is optically contacted along surface 115 to a Faraday rotator glass piece 116. The Faraday rotator glass piece 116 may preferably be a cubic shape for ease of manufacturing. It is also apparent that the Faraday glass piece 116 may be a variety of shapes, so long as the glass piece 116 is optically polished along one of its surfaces for optical contact to a support plug 112 along a surface 115. In this manner, an alternative embodiment is shown and described for the side loaded Faraday rotator assembly which is extremely simple in construction and succeeds because both ends of the support plug 112 are optically contacted to other components of the assembly. The assembly as a whole, is then optically contacted to the gyro frame 12.

While various alternative embodiments of a Faraday rotator and aperture assembly (side and top mounted, optically contacted to a gyroscope frame) for use in conjunction with an out-of-plane multi-oscillator ring laser gyroscope have been disclosed, it is apparent to one with skill in the art that alternative embodiments to those disclosed may also be accomplished according to the teachings of this disclosure. For example, rather than carrying a Faraday rotator, the support plug 82 (FIG. 4) may carry a waveplate, polarizer, or other intra- cavity, optical elements. Therefore, it is desired that the appended claims be construed to cover not only the preferred and alternate embodiments disclosed herein, but also equivalent rotator assembly configurations which may also be used in conjunction with ring laser gyroscope.

What is claimed is:

1. In a multi-mode ring laser gyroscope, including a monolithic frame having a closed cavity therethrough, said cavity defining an out-of-plane configured closed optical pathway formed between each two of a plurality of mirrors affixed to said frame, said ring laser gyroscope comprising:
   transverse mode suppression means associated with said frame;
   said transverse mode suppression means being insertably positioned into a transverse hole, along said frame, which intersects said optical pathway; and,
   said transverse mode suppression means being optically contacted with said frame for securement of said transverse mode suppression means within said ring laser gyroscope;
   whereby, said transverse mode suppression means may be fabricated external to said frame and inserted therein, avoiding contamination or degradation of said gyroscope or said transverse mode suppression means which would adversely affect ring laser gyroscope performance.

2. The multi-mode ring laser gyroscope of claim 1, wherein:
   said transverse mode suppression means comprises:
   a smooth surface optical flat; and an elongated optical plug, said plug having, at one end, a smooth surface, and at the other end, an aperture for transverse mode suppression;
   said plug being mounted by optical contact to said flat, wherein the smooth surfaces of said plug and flat are optically contacted, the flat being of greater diameter than the plug and forming an optically flat flange around the smooth surface end of said plug;
   said optically smooth flange being of sufficiently low surface roughness to optically contact a polished surface of said gyroscope frame when the transverse mode suppression means is mounted into the transverse hole of the frame.

3. The multi-mode ring laser gyroscope of claim 2, wherein:
   the elongated optical plug is of cylindrical shape for ease of positioning within the transverse hole of said frame;
   whereby, the optical plug may be rotated within said hole during fabrication in order to properly align said aperture within said closed optical pathway.

4. The multi-mode ring laser gyroscope of claim 3, wherein:
   an optically polished Faraday glass piece, for providing non-reciprocal polarization rotation, is optically contacted and mounted on said optical plug at the same end and in alignment with said aperture;
   said Faraday glass piece covering said aperture and being affixed to said plug without undue strain.

5. The multi-mode ring laser gyroscope of claim 4, wherein:
   said Faraday glass piece covering said aperture is mounted on a support pedestal extending outwardly and orthogonal from the surface of said plug;
   the perimeter of said Faraday glass piece being surrounded by a plurality of annular magnetic dipoles, said dipoles affixed to one another and to said plug by the use of a metallic sealing material, said dipoles not directly contacting said Faraday glass piece.

6. The multi-mode ring laser gyroscope of claim 5, wherein:
said metallic sealing material is indium.

7. The multi-mode ring laser gyroscope of claim 3, wherein:
an optically polished Faraday glass piece, for providing non-reciprocal polarization rotation, is optically contacted and mounted on said optical plug.

8. In a multi-mode ring laser gyroscope, including a monolithic frame having a closed cavity therethrough, said cavity defining an out-of-plane configured closed optical pathway formed between each two of a plurality of mirrors affixed to said frame, said ring laser gyroscope comprising:
a Faraday glass piece;
a smooth surface optical flat; and,
an elongated optical plug, said plug having, at one end, a smooth surface, and at the other end, a flat surface that is polished for receiving and optically contacting said smooth surface optical flat;
said Faraday glass piece being mounted at said one end of said plug by optical contact to said smooth surface within the optical pathway
whereby, a Faraday biasing mechanism may be achieved which includes a Faraday glass piece fabricated external to said frame and inserted therein, avoiding contamination or degradation of the gyroscope which would adversely affect ring laser gyroscope performance.

9. The multi-mode ring laser gyroscope of claim 8, wherein the Faraday rotator is substantially cubic.

10. A multioscillator ring laser gyro comprising:
a ring laser block having at least four corner mirrors and cavities therebetween, said cavities having a laser gas therein, means for stimulating lasing of said laser gas, and means, including a Faraday element within one of said cavities;
at least one bore formed in said block, extending from outside of said block into said block and each said bore intersecting a branch of said laser cavity at a predetermined angle, the outside of said block adjacent each said bore being optically flat;
at least one plug for each of said bores, each said plug being shaped to the contour of its respective said bore, in hermetic seal to said bore, respectively, each said plug having an optically smooth surface on at least one end for optically contacting a separate optically smooth flat forming a flange on the outer end of said plug the surface of said flange of said flat on each said plug facing said block being optically flat, said optically flat surfaces on said plug and said block being parallel and contacting when said plug is in its fully inserted position;
the inner end of one of said plugs attached to and fixing the position of said Faraday element.

11. The apparatus as recited in claim 10 wherein magnets for said Faraday element are rigidly attached to the said plug to which said Faraday cell is attached.

12. A multioscillator ring laser gyro comprising:
a ring laser block having at least four corner mirrors and cavities therebetween, said cavities having a laser gas therein, means for stimulating lasing of said laser gas, and means, including a Faraday element within one of said cavities;
at least two bores formed in said block, extending from outside of said block into said block and each said bore intersecting a branch of said laser cavity at a predetermined angle, the outside of said block adjacent each said bores being optically flat;
at least one plug for each of said bores, each said plug being shaped to the contour of its respective said bore, in hermetic seal to said bore, respectively, each said plug having a flange on the outer end thereof, the surface of said flange on each said plug facing said block being optically flat, said optically flat surfaces on said plug and said block being parallel and contacting when said plug is in its fully inserted position;
the inner end of one of said plugs attached to and fixing the position of said Faraday element; and,
a mode-restricting aperture attached to the inner end of a second said plug and intersecting said cavity.

* * * * *